Dec. 30, 1969    P. FRANCHI    3,486,377
ULTRASONIC GAUGE SYSTEM
Filed Jan. 23, 1967
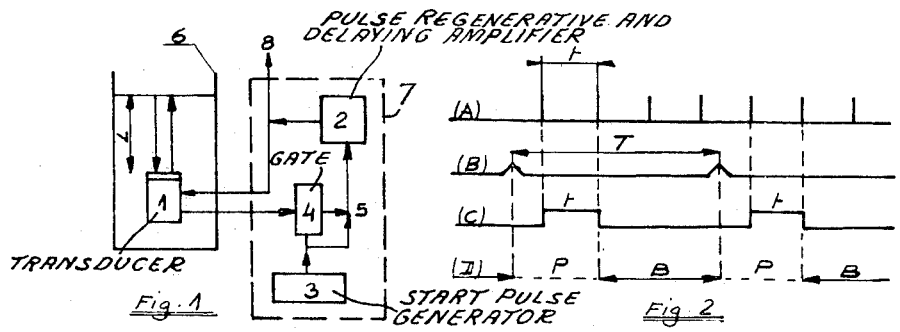
Fig. 1    Fig. 2
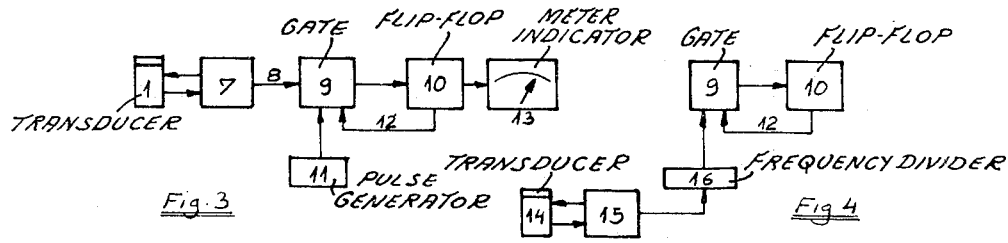
Fig. 3    Fig. 4
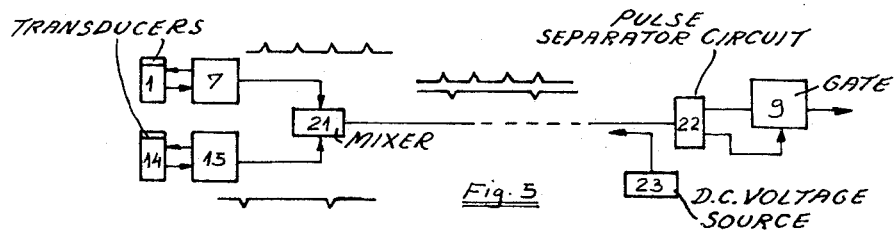
Fig. 5
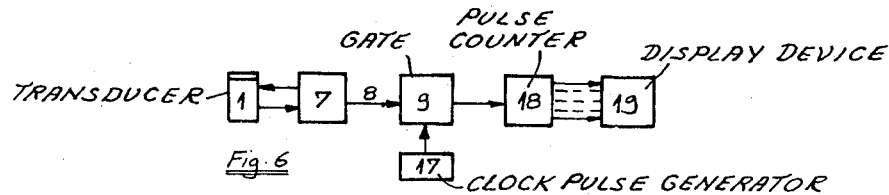
Fig. 6
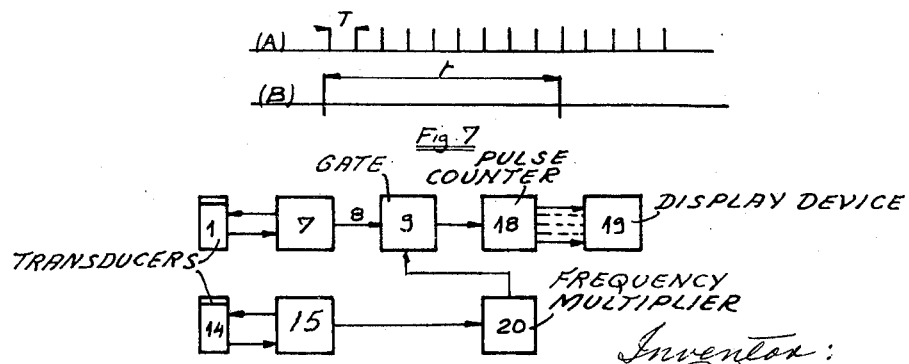
Fig. 7
Fig. 8
Inventor:
Pierre Franchi
By Kemon, Palmer,
Stewart & Estabrook
Attorneys United States Patent Office 3,486,377
Patented Dec. 30, 1969

3,486,377
ULTRASONIC GAUGE SYSTEM
Pierre Franchi, Vitry-sur-Seine, France, assignor to L'Electronique Appliquee, Paris, France
Filed Jan. 23, 1967, Ser. No. 610,868
Claims priority, application France, Feb. 8, 1966, 48,732
Int. Cl. G01f 23/14
U.S. Cl. 73—290     1 Claim

ABSTRACT OF THE DISCLOSURE

An ultrasonic gauge system measures the level of a liquid from the time interval occurring in a to and fro travel of an ultrasonic pulse from a transducer and back. A relaxation circuit feeds the transducer with electrical pulses the recurrence frequency of which is controlled from said time interval. Said pulses are applied to a gate controlled from a pulse generator of fixed recurrence frequency and the output of said gate is applied to shaping circuits for an analog and/or digital direct display of the value of the measured level.

SUMMARY

The present invention concerns improvements in or relating to ultrasonic gauge systems for measuring levels of liquids of the kind wherein at least one transducer is arranged either within or above the liquid, as the case may be, and generates ultrasonic pulses each of which travels to and fro said transducer as being at least partially reflected on the surface of the liquid medium. As commonly known, the information consisting of the time interval between the time instants a pulse is transmitted and is received back on the transducer may give a measure of the level as it is proportional to the distance from said transducer to said level of the surface of said liquid.

According to a feature of the invention, an ultrasonic gauge system of the above specified purpose and kind comprises the combination of a pulse relaxation arrangement consisting in a loop comprising said transducer, the path from said transducer to the surface of the liquid and back, and a pulse reshaping and delaying circuit across said transducer, of means including an electronic gate for deriving said pulses from said circuit, of a pulse generator circuit of fixed recurrence frequency having an output connected to a control input of said means, and of means for processing the output of said gate to control at least one level value displaying member.

DESCRIPTION OF DRAWINGS

This and further features of the invention will be fully described with reference to the accompanying drawings, wherein:

FIG. 1 shows an illustrative embodiment of a pulse relaxation arrangement in a system according to the invention;

FIG. 2 shows graphs for explaining the operation of further circuits in such a system;

FIG. 3 shows a circuit arrangement for displaying the measures from an analog processing of the information from the arrangement of FIG. 1;

FIG. 4 shows a partial modification of FIG. 3 for an automatic taring of the system;

FIG. 5 shows a further modification of either FIG. 3 or FIG. 4;

FIG. 6 shows a circuit arrangement for displaying the measured values from a digital processing of the information from the arrangement of FIG. 1;

FIG. 7 shows graphs for explaining the operation of the arrangement of FIG. 6; and FIG. 8 shows an arrangement according to FIG. 6 and additional embodying an automatic taring arrangement.

From said figures and description relating thereto hereinbelow, any modification within the scope and field of the invention can be derived without further explanation.

DETAILED DESCRIPTION

With reference to FIG. 1, the transducer 1 is illustratively shown within a liquid medium contained in a vat 6. The transducer is connected to a pulse regenerative amplifier 2 of any known kind which reshapes with some degree of electrical amplification and a constant predetermined delay any pulse from the transducer passing through a gate 4 in order to re-apply the reshaped, amplified and delayed pulse to said transducer 1. Actually, the combination of the transducer 1, the pulse regenerative amplifier 2 and the path to and fro between the transducer and the surface of the liquid in the vat 6 constitutes a pulse relaxation arrangement the recurrence frequency of the pulses of which is directly controlled from the distance between the transducer and the said surface of the liquid. The same will remain true if the transducer is arranged above the surface of the liquid and the ultrasonic pulses passing through air from the transducer to the liquid and back.

Simultaneously to their application to the transducer, the electrical pulses from circuit 2 may be derived at an output 8 of said circuit. Such a series of pulses is illustratively shown on a graph (A) of FIG. 2. These pulses are spaced by a time interval $t$ which depends upon (and is proportional to) the distance L of the travel of the ultrasonic pulse from the transducer 1 to the surface of the liquid and back to said transducer, FIG. 1.

It must be understood that, as usual and of common practice in transmitter-receiver pulse circuits of any kind, the circuits included in the amplifier 2 are prevented from entering into free oscillation; for instance the receiver part of 2 is blocked during a predetermined minimum time interval each time its output emits a pulse at 8 and to the transducer 1. In other words, as usual, a feedback is internally provided from the output to the input of 2 for blocking an input stage thereof.

The initiation of the operation is ensured from a pulse generator 3 the output of which is connected together with the output of the gate 4 to the input of the amplifier 2. The generator 3 has a recurrence frequency of very low value with respect to the recurrence frequency of the ultrasonic pulses so that the pulses from 3, in addition to the initiation of the relaxation, each acts as some kind of "resetting to zero" pulse. In order that a pulse from 3 and a pulse from the transducer 1 cannot interfere, the gate 4 is blocked each time the generator 3 applies a pulse to the input 5 of the amplifier 2, during a time interval sufficient for stopping a pulse from the transducer which has not been generated by the pulse issuing from 3 and applied to 2. For instance, in this respect, gate 4 includes a one-shot activated from any pulse from the generator 3 and the condition of said one-shot, when activated, blocks a transfer circuit connected to the output of the transducer.

Referring to FIG. 3, the output of the arrangement 7 of FIG. 1 is shown connected to one input of an electronic gate 9 controlled in the following manner: a clock circuit 11 delivers clock pulses such as shown in the graph (B) of FIG. 2, spaced apart by a time interval T lengthier than any time interval $t$ of the pulses from the output 8 of the arrangement 7. Each pulse from the clock circuit 11 places the gate 9 into a condition in which any pulse on the input 8 is transmitted through it. However, the first pulse at 8 activates an Eccles-Jordan trigger circuit 10, and the second pulse passing through 9, once it has been controlled from a clock pulse, brings back the Eccles-Jordan circuit to its first condition. A feedback connection 12 then blocks the gate 9 until a further clock pulse "re-opens" it. Consequently, the changes of conditions of the gate 9 are such as shown in line (D) of FIG. 2, wherein the letter P indicates a passing condition and the letter B, a blocked condition of said gate 9. The Eccles-Jordan circuit delivers current "teeth" such as shown at $t$ in the graph (C) of said FIG. 2. The mean or average amplitude of such a wave-form is given by the relation:

(i) $\qquad i_m = K.(t/T) = K.(2L/cT)$ since one obviously has:

(ii) $\qquad t = 2(L/c)$ with $c$ denoting the speed of propagation of the ultrasonic pulses within the liquid medium wherein the transducer is merged.

A meter indicator 13, such as a moving frame galvanometer consequently displays the value of $i_m$, proportional to the distance L. In order to take into account the value of the parameter $c$, the value of T may be adjusted or the amplitude of each tooth $t$ and/or the value of the coefficient K (for instance by acting in this latter case, on a potentiometer in the output of 10). Whatever the factor to be adjusted, a preliminary taring is necessary prior to each measuring operation when the nature of the medium is changed.

In order to avoid such a drawback and on the other hand, to obtain an automatic taring adjustment, it is provided when desired to have recourse to an arrangement such as shown in FIG. 4 (as a partial modification to be included in the diagram of FIG. 3): a transducer 14 similar to transducer 1 is connected to a circuit arrangement 15 identical to the circuit arrangement 7 of FIGS. 1 and 3. Said transducer 14 is arranged in the same medium as the transducer 1 but operates with a fixed acoustic distance $L_0$ (for instance, in FIG. 1, the transducer 14 is substituted to the transducer 1 and the circuit arrangement 15 to the circuit arrangement 7 but the vat containing the transducer 14, though filled with the same liquid as the vat 6, presents a predetermined volume of constant level). The output of 15 is applied to a recurrence frequency divider of any known kind, so that one pulse over $n$ pulses from 15 is applied to the gate 9 in substitution to the clock pulses from 11 in the circuit of FIG. 3. Apart from this modification, the system is the same as in said FIG. 3.

With such modification, the time interval T is given by the relation:

(iii) $\qquad T = n.(2L_0/c)$ and the average value of the teeth of current issuing from the Eccles-Jordan circuit is given by the relation:

(iv) $\quad i_m = K.(2L/c).(1/n).(c/2L_0) = (K.n).(L/L_0)$ so that $i_m$ does not depend any more of the value $c$ of the speed of propagation of sound within the medium.

In both systems of FIG. 3 and FIG. 4, the time interval T must be always higher than twice the maximum interval $t$ between two pulses issuing from the connection 8. In both systems too, an adjustment can be made for the coefficient K in order to adjust the scale of the meter 13 by adjustment of the position of the tap of a potentiometer in the output of the flip-flop 10.

Whether or not an automatic taring is provided, the system may comprise a local portion and a remote indicating portion as, for instance, shown in FIG. 5: a mixer circuit 21 ensures the transmission through a two-wire cable, for instance, of the two series of pulses $t$ and T to a remote circuit 22 which ensures the separation of the series of pulses for their application to the gate 9. At 23 is indicated a voltage source of D.C. character which, through another wire of said cable, ensures the application to the local circuits 7, 15 and 21 of the high voltage supply necessary to such circuits. For the sake of simplicity the distribution of said D.C. supply to said circuits from the cable is not shown.

When it is desired to obtain a digitalized display, the modifications corresponding to the arrangements of FIGS. 3 and 4 are shown respectively on FIGS. 6 and 8. To the clock circuit 11 of FIG. 3, is substituted in FIG. 6 a clock circuit 17 having a recurrence frequency appreciably higher than the maximum recurrence frequency of the pulses which may issue from the relaxation arrangement from 8, and further the application of the series of pulses are interchanged on the inputs of the gate 9 so that the pulses from 8 control the passing and blocked periods of the gate, one upon two obviously which is easily made with a flip-flop, whereas the pulses T from 17 are applied to the information input of said gate 9. With reference to FIG. 7, one may see that during one period $t$ upon two, a number of pulses spaced apart by the clock pulse interval T passes through the gate 9, and said number is proportional to the length of the time interval $t$. The output of 9 is connected to a pulse counter 18 which is periodically read out for a display at 19 through a conventional decoding arrangement. The read-out of 18 may be controlled for instance one period over two of the pulses $t$, each time the said pulses block the gate 9; such selected pulses also ensures the resetting of the counter 18 to zero according to a conventional process. The selection is easy when a flip-flop is used as described for the control of the gate 9 as it then suffices to apply to the reset input and the read-out output of 18 pulses appearing on one output of said flip-flop when it changes its condition for blocking the gate proper. The display device 19 may be visual and/or printed, as conventional. The adjustment may be made by a choice of the value T in the clock circuit 17.

In FIG. 8, the circuit 15 is followed by a frequency multiplier 20 the output of which is applied to the input of gate 9, controlled from the pulses from 8 as in FIG. 6. The signals applied to 9 are such as shown in FIG. 7

With an arrangement as shown in FIG. 6, the number N displayed at 19 is given by the relation:

(v) $\qquad N = (t/T) = (2L)/(c.T)$ whereas, in the arrangement of FIG. 8, this number is:

(vi) $\qquad N = (2L/c).(n.c/2L_0) = n.(L/L_0)$ which does not depend of the value $c$. Taring the system is basically ensured by a suitable choice of the number $n$ since one has:

(vii) $\qquad T = (1/n).(2L_0/c)$ and, as n is an integer, the value of the reference distance $L_0$ must be appropriately chosen too so that in any case T be an integer sub-multiple of $t$ at the minimum value possible for $t$.

What is claimed is:
1. An ultrasonic gauge system for measuring the level of a liquid from the measurement of the time intervals between the time instants of emission and reception of a series of ultrasonic pulses from a transducer to the reflecting surface of said liquid and back, said system comprising:

converter means for converting the received ultrasonic pulses into a series of electrical pulses having a recurrence frequency identical to that of said ultrasonic pulses;

a constant frequency clock pulse generator, the recurrence frequency of which is lower than the lowest possible recurrence frequency of the pulses from said converter;

a bistable flip-flop circuit reversing its state at each input pulse applied on an actuation input thereof, and having a pulse derivative output and a rectangular wave-form output;

an averaging amplitude meter connected to said rectangular waveform output for indicating the time interval occurring between each two input pulses on the actuation input of said flip-flop circuit;

and an electronic gate having:

an information input connected to the output of said converter, an output connected to the actuation input of said flip-flop circuit, a first control input connected to the output of said clock pulse generator and adapted to set said gate in its pulse transmitting condition at each clock pulse on said first control input, and a second control input connected to the pulse derivative output of said flip-flop circuit and adapted to set said gate in its pulse blocking condition at each pulse from said derivative output of said flip-flop circuit whereby the rectangular wave-form output of said flip-flop circuit carries in its average amplitude the measure of the time intervals between the pulses of each pair of successive pulses from said converter passing through said gate.

References Cited

UNITED STATES PATENTS 2,775,748  12/1956  Rod et al. _____ 73—290 XR
3,100,885  8/1963  Welkowitz et al. ____ 73—29 XR DONALD O. WOODIEL, Primary Examiner